Figure 1:
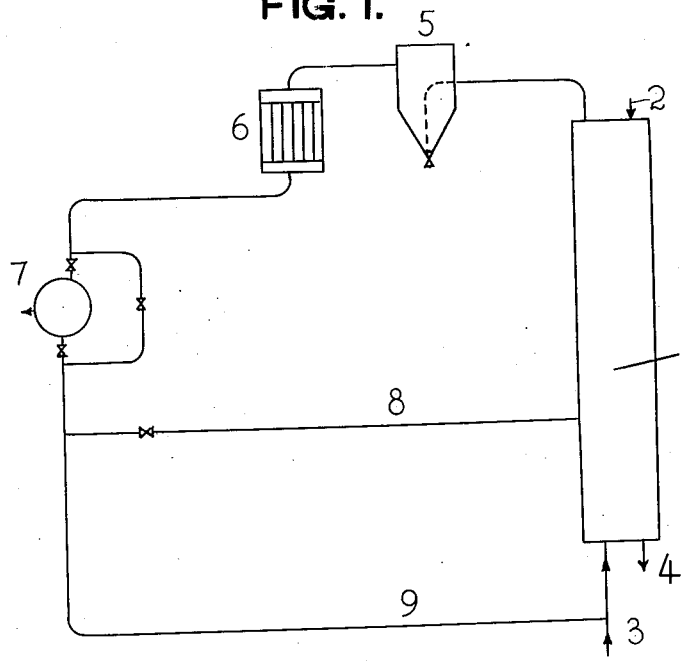

Sept. 25, 1934.                K. W. YOUNG                1,974,886
                         ROASTING OF SULPHIDE ORES
                           Filed Dec. 14, 1932

INVENTOR.
Kenneth William Young

BY
                                                    ATTORNEY.

Patented Sept. 25, 1934

1,974,886

UNITED STATES PATENT OFFICE 1,974,886

ROASTING OF SULPHIDE ORES

Kenneth William Young, Norton-on-Tees, England, assignor to Imperial Chemical Industries Limited, a corporation of Great Britain Application December 14, 1932, Serial No. 647,263
In Great Britain December 15, 1931

4 Claims. (Cl. 75—60)

This invention relates to the roasting of sulphide ores, such as zinc blende or pyrites, in particular cuprous pyrites, for the purpose of converting the non-ferrous metals contained therein to the form of sulphate with the subsequent extraction of the sulphate by solution or other means.

The object of the present invention is to improve the yield of sulphates of non-ferrous metals, in processes of the kind referred to, by effecting a simultaneous control of the temperature and of the concentration of sulphur dioxide in the roasting operation. It will be understood that the roasting may be carried out in any known type of pyrites burner, including rotary kilns, shaft furnaces and various types of mechanical furnaces. For convenience, therefore, the term "burner" is hereinafter employed to describe any such apparatus in which the roasting operation is carried out.

I have found that sulphide ores containing copper and/or zinc or other non-ferrous metals may advantageously be treated for the production of sulphur and/or sulphur dioxide, together with iron oxide, simultaneously with the conversion of the copper and/or zinc or other non-ferrous metal into the form of sulphates, by subjecting the said ores to an oxidizing roast at a definite temperature and in the presence of a definite concentration of sulphur dioxide, which may be obtained by recirculating a quantity of the sulphur dioxide containing gases issuing from the upper portion of the burner, after enrichment in sulphur dioxide in any desired manner.

The concentration of sulphur dioxide in contact with the materials undergoing sulphatization should be at least 20% and the temperature should be maintained between 600–800° C. and is preferably maintained at about 700° C. At the lower temperatures, e. g. about 600° C. or lower, the rate of formation of copper and zinc sulphates is low, and moreover, considerable quantities of iron sulphate are formed which lead to complications in the course of the subsequent extraction of the non-ferrous sulphates. On the other hand, at higher temperatures of the order of 800° C. or above, the formation of sulphates, both of copper and zinc as well as iron, falls off. At the optimum temperature of 700° C., the extent of sulphatization of copper increases rapidly with increase of sulphur dioxide concentration up to about 25%, and then remains fairly constant.

The present invention, therefore, comprises a process in which sulphide ores such as pyrites, or burnt pyrites, or other suitable materials containing copper and/or zinc wholly or partially in the form of their sulphides, are treated at a temperature of between 600–800° C. and in the presence of a gas containing free oxygen together with at least 20% of sulphur dioxide in order to convert the non-ferrous metals into sulphates the stated concentration of sulphur dioxide being preferably obtained by concentrating and recirculating part of the effluent gases from the burner or by concentrating any other convenient supply of dilute sulphur dioxide gases.

The invention applies only to the treatment of such ores or materials as contain sufficient sulphur or metal sulphide to maintain the necessary reaction temperature, the combustion air and/or sulphur dioxide being preheated if desired. When treating sulphide ores such for example as pyrites the sulphatization process of this invention may be conducted in the same furnace or kiln in which the oxidation of the ores is effected, but the process may also be conducted in a separate apparatus and may if desired be applied to sulphide or oxide-sulphide residues or concentrates from other operations.

The invention will now be described and illustrated with reference to the roasting of pyrites in a shaft furnace. The pyrites is fed into the upper end of the furnace and combustion air and suitable quantities of gases rich in sulphur dioxide are admitted separately or together at one or more depths in the furnace. The first stage of the process occurs in the upper zone of the furnace and in this stage the oxidation of the pyrites commences with the production of iron oxide and sulphur dioxide, and possibly some free sulphur, and the temperature of this stage is preferably controlled by the introduction of relatively cool gas, obtained by cooling part of the effluent gases from the burner. In this stage non-ferrous metals such as copper and zinc may remain un-oxidized in the form of sulphide, or they may be converted wholly or partially to the form of oxide. The second stage of the process occurs in the lower parts of the furnace and in this stage sulphatization of non-ferrous metals takes place along with complete or substantially complete oxidation of the remaining sulphides. The temperature is maintained at 600–800° C. and the sulphur dioxide concentration at at least 20 per cent. In the case when the temperature in this stage is maintained at 700° C. and the highest temperature in the oxidation stage is 850° C. the gases admitted may conveniently consist of 1 volume of air admixed with ⅓ volume of 100 per cent. sulphur dioxide. It may be necessary to preheat this mixture of air and sulphur dioxide in order to maintain the reaction temperature and the degree of preheat will vary with the percentage of sulphur in the form of sulphide in the partially burnt ore entering this stage. Thus for example with 5 per cent. sulphur a preheat temperature of approximately 310° C. will be required, with 10 per cent. approximately 170° C. and with 15 per cent, approximately 35° C. A third stage may, if desired, be maintained by suitable control of the temperature and gas composition, and in this stage relatively intense oxidizing conditions occur so that oxidation of all traces of sulphide is completed. This stage may be located in the burner in a zone either above or below the sulphatizing zone. Thus the conditions of temperature and sulphur dioxide and oxygen concentration in each of these stages are controlled by the suitable addition of combustion air and concentrated sulphur dioxide gas at one or more depths in the furnace. In the simplest form of operation the necessary amount of combustion air and concentrated sulphur dioxide gas is added together at the lower end of the furnace where the temperature is of the order of 400–600° C. A continuous rise in temperature and increase in sulphur dioxide concentration occurs as the gases pass upwardly in contact with the pyrites. At an intermediate depth the temperature will have risen to a sufficient extent (e. g. to 600–800° C.) for sulphatization to occur and in the upper part of the furnace the temperature will rise still further (e. g. to 800–1000° C.) and oxidation of freshly added pyrites will occur. Sufficient sulphur dioxide gas must be added with the combustion air in order to prevent too great a rise of temperature in the upper part of the furnace. This simple form of the process suffers from the drawback that the oxidizing conditions at the lower end of the shaft are not adequate to effect complete removal of all sulphide which thus remains as an impurity in the burnt ore.

Preferred forms of the process will now be described with reference to the accompanying drawing. In both figures a shaft furnace 1 is fed with pyrites at 2 and supplied with combustion air at 3. The burnt pyrites cinders are withdrawn at 4 and the effluent gases from the furnace are passed through a dust collector 5 and cooler 6, to a sulphur dioxide concentration plant 7. The concentration of sulphur dioxide may be effected in any known or suitable manner, e. g. by liquefaction or by washing with a suitable solvent and subsequently recovering the dissolved gas by heating and/or reduction of pressure. Part of the gases may be allowed to by-pass the concentration plant so that the degree of concentration may be controlled and a suitable quantity of sulphur dioxide may be withdrawn from the circulating system at a rate equivalent to the rate of feed of fresh pyrites, and employed in any suitable manner, e. g. in sulphuric acid manufacture. In Figure 1 the concentrated sulphur dioxide is divided into two portions. One portion as shown at 8 is introduced at an intermediate depth in the furnace, while the other portion as shown at 9, is introduced at the bottom of the furnace together with the combustion air. In the upper part of the furnace distillation of the labile sulphur of the pyrites and oxidation of the resultant ferrous sulphide commences, the temperature of the oxidation being controlled by means of the recirculated sulphur dioxide admitted at 8. In the lower part of the furnace the partially or completely oxidized ore is subjected to sulphatization conditions controlled by the combustion air and the sulphur dioxide recirculated at 9. These gases may if desired be preheated.

Figure 2:
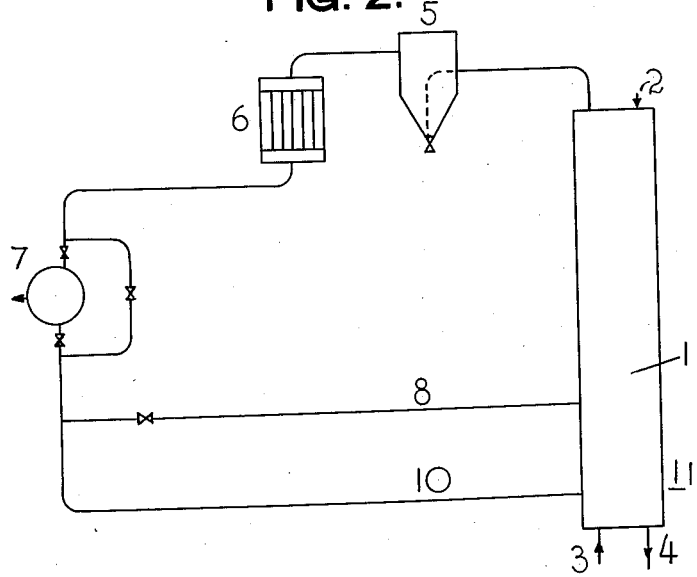

In Figure 2 the sulphur dioxide recirculated for the purpose of controlling the sulphatization step is admitted at a depth 10 which is below the point 8 at which gas is admitted for purposes of temperature control of the oxidation zone. A certain quantity of combustion air is added at 11 at the same depth as the sulphur dioxide gases 10 and the remainder of the combustion air is admitted at 3. In this manner three separate zones are set up in the furnace. The upper zone is maintained at a temperature of 800–1000° C. and effects the oxidation of the pyrites. The intermediate zone is maintained at a temperature of 600–800° C. and effects the sulphatization of nonferrous metals such as zinc and copper. The lowest zone is maintained at about 400–700° C. with very low sulphur dioxide concentrations in the gas and the resulting intense oxidizing conditions effect the removal of substantially all traces of sulphide from the oxidized and sulphated materials.

I claim:

1. In a process for the roasting of iron sulphide ores containing other sulphides, such as copper and zinc sulphides, for the recovery of the iron in the form of iron oxides and the other metals in the form of sulphates, the steps of de-sulphurizing the iron sulphide in said ore by passing said ore in counter current with an oxygen carrying gas through an oxidizing atmosphere and maintaining within the passage of the ore through the roasting gases a zone in which the temperature is maintained between 600 and 800° C. and the roasting gases at a concentration of at least 20% $SO_2$.

2. The process of claim 1, in which a gas enriched in $SO_2$ content is produced from the effluent gases from the roasting operation and said enriched gas is returned to the roasting operation in a quantity to provide a gas of at least 20% $SO_2$ content in the zone maintained between 600 and 800° C.

3. In a process for the roasting of iron sulphide ores containing other sulphides, such as the sulphides of copper and zinc, for the recovery of the iron in the form of iron oxides and the other metals in the form of sulphates, the steps of de-sulphurizing the iron sulphide in said ore by passing said ore in counter current with an oxygen carrying gas through an oxidizing atmosphere, enriching effluent gases from said roasting operation in their $SO_2$ content, introducing such enriched $SO_2$ gases into the roasting operation, maintaining within the passage of said ore through the roasting gases a zone in which the temperature is maintained between 600 and 800° C. and the roasting gases within said zone at a concentration of at least 20% $SO_2$ and admitting at least part of the supply of the oxygen at a substantial distance from said zone.

4. In a process for the roasting of iron sulphide ores containing other sulphides, such as the sulphides of copper and zinc, for the recovery of the iron in the form of iron oxides and the other metals in the form of sulphates, the steps of passing the ore in counter current with an oxygen carrying gas through a roasting furnace in which an upper, oxidizing zone is maintained at a temperature of about 800 to 1000° C. in which the main part of the iron sulphide is de-sulphurized and oxidized, maintaining the next lower zone at a temperature of about 600 to 800° C. and maintaining the SO₂ concentration in said zone at at least 20%, in which zone the non-ferrous metals such as zinc and copper are sulphatized, and submitting the so treated ore in the lowest zone of said roasting furnace to a strongly oxidizing atmosphere at a temperature below that of the intermediate zone, oxygen carrying gases being admitted into said lowest zone and into the intermediate zone, gases richer in SO₂ than the effluent gases from said burner being also admitted into the lowermost zone and into the intermediate zone.

KENNETH WILLIAM YOUNG.